United States Patent Office 3,847,956
Patented Nov. 12, 1974

3,847,956
2-HYDROPEROXYCARBOXYLIC ACIDS AND
THEIR PREPARATION
Leonard S. Silbert, Philadelphia, Philip E. Pfeffer, Warrington, and Dolores A. Konen, Philadelphia, Pa., assignors to the United States of America as represented by the Secretary of Agriculture
No Drawing. Filed Apr. 6, 1973, Ser. No. 348,554
Int. Cl. C08h 17/36
U.S. Cl. 260—413     18 Claims

ABSTRACT OF THE DISCLOSURE

Aliphatic 2-hydroperoxycarboxylic acids, useful as oxidizing agents, adding slowly to oxygen-saturated ethyl ether at about −80° C. a dianion solution of a carboxylic acid and isolating the hydroperoxycarboxylic acid by acidification and ethyl ether extraction.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of aliphatic 2-hydroperoxycarboxylic acids and more specifically to the preparation of some novel straight and branched-chain 2-hydroperoxycarboxylic acids.

The preparation of 2-substituted 2-hydroperoxyesters in which the substituents are aryl, methyl and cyclohexyl has been reported (Proc. Chem. Soc. *1962*, 150 and British Patent 993,480). However, even though it is common practice in many cases to prepare acids via the ester route, this procedure cannot be used to make the compounds of this invention because the 2-hydroperoxyesters decompose under conditions necessary to hydrolyze them to the acids.

Preparation of 2-hydroperoxides by autoxidation of fatty acids was attempted but was not successful (Fette, Seifen, Anstrichmittel, *72*, 1025 (1970), ibid., *71*, 92, 1969, ibid *70*, 456, 1968, and C. R. Acad. Sci., Paris, Ser. C., *1969*, 1006). Difficulties encountered in free radical abstraction of α-methylene hydrogen was attributed to the high bond strength of unactivated C-H bonds (J. Chem. Ed. *36*, 111, 1959) as well as to the dependence of hydrogen abstraction from this site on the polar nature of the free radical abstractor (Proc. Chem. Soc., *1962*, 295) and J. Chem. Soc., *1964*, 4737). In addition, the products of autoxidation of fatty acids and of their esters differ. The acids are autoxidatively decarboxylated to hydrocarbon products and the esters are autoxidized to hydroperoxides randomly distributed along the alkyl chain but not at the 2- and 3-position (Rev. Franc. Corps Gras, *17*, 619, 1970).

It is therefore an object of this invention to provide a method of preparing aliphatic 2-hydroperoxycarboxylic acids.

Another object of this invention is to provide novel 2-hydroperoxycarboxylic acids not heretofore available.

According to this invention the above objects are accomplished by slow addition of dianion solutions of carboxylic acids into oxygen-saturated ethyl ether at about −80° C. and isolation of the 2-hydroperoxides after acidification and extraction by conventional techniques.

The dianions are prepared according to the method described in U.S. Pat. 3,652,612. Optimum formation of the dianion from straight chain fatty acids is attained below room temperature with lithium diisopropylamide in tetrahydrofuran (THF) - hexamethylphosphoramide (HMPA) whereas the dianions from α-branched chain fatty acids are prepared at about 50° C. lithium diisopropylamide in the THF or THF–HMPA.

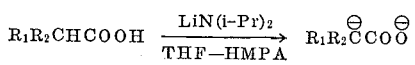

where $R_1$ is alkyl and $R_2$ is H or alkyl.

The 2-hydroperoxides are prepared from the above dianions by slow addition of the dianion solutions into oxygen-saturated ethyl ether at −80° C.

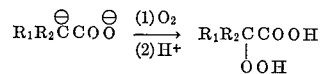

where $R_1$ is alkyl and $R_2$ is H or alkyl.

The products are isolated by acidifications and conventional extraction techniques.

Preparation of the straight chain acids is exemplified by the following:

The dianion of octanoic acid was prepared from octanoic acid (5 g., 0.0347 mol) and lithium diisopropylamide (0.076 mol) in THF (175 ml.) containing HMPA (6.25 g., 0.034 mol) by the method described in US. Pat 3,652,-612. The dianion solution was added dropwise from an addition funnel maintained under a nitrogen atmosphere into a flask containing oxygen-saturated diethyl ether (175 ml.) which was maintained at saturation by a continuous oxygen flow. The dianion solution was transferred from funnel to flask through a teflon tube, one end of which was attached to the funnel tip and the other end kept below the surface of the ether. The solution was maintained at −77° through the addition of dianion (75 min). The reaction mixture was allowed to warm up to −10°, acidified with dilute HCl and extracted with three portions of ether. The combined ether solutions were extracted with three portions of dilute HCl, dried and the ether evaporated to give 6.0 of crude product. Iodometric analysis indicated 50% content of 2-hydroperoxy acid. Crystallization from pentane followed by recrystallization from pentane-ether gave pure 2-hydroperoxyoctanoic acid (99.2% purity by iodometry), M.P. 67–68.

Preparation of the branched-chain acids is exemplified by the following:

The dianion of 2-propylmyristic acid was prepared from 2-propylmyristic acid (6.0 g., 0.022 mol) and lithium diisopropylamide (0.0488 mol) in THF (150 mol) by heating at about 50° C. for about 2 hours. The dianion solution was added dropwise from an additional funnel maintained under a nitrogen atmosphere into a flask containing oxygen-saturated diethyl ether (175 ml.) which was maintained at saturation by a continuous oxygen flow. The dianion solution was transferred from funnel to flask through a teflon tube, one end of which was attached to the funnel tip and the other end kept below the surface of the ether. The solution was maintained at −77° through the addition of dianion (90 min.). The reaction mixture was allowed to warm up to −10°, acidified with dilute HCl and extracted with three portions of ether to give 6.0 gms. of crude product. Iodometric analysis indicated 75° content of 2-hydroperoxy acid. Column chromatography of the product on silicic acid, analytical reagent, 100 mesh, at a ratio of 20 to 40 gms of silicic acid per gram of product, with a 50/50 (volume basis) mixture of ethylene chloride and ethyl alcohol gave pure 2-hydroperoxy-2-propylmyristic acid (99+% pure by iodometric analysis).

The 2-hydroperoxy acids prepared by the method of this invention are shown in Table 1. 2-Hydroperoxyoleic acid and 2-hydroperoxy-2-heptyldecanoic acid were found *in situ* but decomposed rapidly.

The 2-hydroperoxy acids prepared by the process of this invention are useful as oxidizing agents and for the preparation of symmetrical and unsymmetrical ketones directly from carboxylic acids.

TABLE I

| Carboxylic acid | M.P., °C. | Yield |
|---|---|---|
| Straight chain: | | |
| Octanoic | 67–68 | 50 |
| Nonanoic | 70–71 | 32 |
| Myristic | 89–92 | 50 |
| Oleic | | 31 |
| α-Branched: | | |
| 2-heptyldecanoic | (1) | |
| 2-methylpentanoic | Liquid | 72 |
| 2-propylmyristic | Liquid | 75 |
| 2-methylmyristic | 57–58 | 66 |
| 2-ethylmyristic | Liquid | 70 |
| 2-methylcapric | 42.5 | 70 |
| 2-ethylcapric | Liquid | 72 |

[1] Decomposed.

We claim:

1. A process for the preparation of 2-hydroperoxycarboxylic acids comprising adding slowly to oxygen-saturated ethyl ether at about −80° C a dianion solution of an aliphatic carboxylic acid, warming the reaction mixture to about −10° C, acidifying the mixture with dilute hydrochloric acid and extracting out the 2-hydroperoxycarboxylic acid with ethyl ether.

2. A process for the preparation of the 2-hydroperoxides of carboxylic acids selected from the group consisting of octanoic, nonanoic, myristic, oleic, 2-heptyldecanoic, 2-methylpentanoic, 2-propylmyristic, 2-methylcapric, 2-ethylcapric, 2-methylmyristic and 2-ethylmyristic, comprising the steps of:
   (a) adding slowly to oxygen-saturated ethyl ether at about −80° C. a dianion solution of the selected carboxylic acid;
   (b) warming the reaction mixture of step (a) to about −10° C;
   (c) acidifying the warmed reaction mixture of step (b) with dilute hydrochloric acid; and
   (d) extracting the acidified mixture with ethyl ether to the 2-hydroperoxycarboxylic acid.

3. The process of Claim 2 in which the carboxylic acid is octanoic acid.
4. The process of Claim 2 in which the carboxylic acid is oleic acid.
5. The process of Claim 1 in which the carboxylic acid is 2-methylpentanoic acid.
6. The process of Claim 2 in which the carboxylic acid is 2-propylmyristic acid.
7. The process of Claim 2 in which the carboxylic acid is 2-ethylcapric.
8. 2-hydroperoxyoctanoic acid.
9. 2-hydroperoxynonanoic acid.
10. 2-hydroperoxymyristic acid.
11. 2-hydroperoxoleic acid.
12. 2-hydroperoxy-2-heptyldecanoic acid.
13. 2-hydroperoxy-2-methylpentanoic acid.
14. 2-hydroperoxy-2-propylmyristic acid.
15. 2-hydroperoxy-2-methylmyristic acid.
16. 2-hydroperoxy-2-ethylmyristic acid.
17. 2-hydroperoxy-2-methylcapric acid.
18. 2-hydroperoxy-2-ethylcapric acid.

References Cited

UNITED STATES PATENTS 3,705,922  12/1972  Callighan ＿＿＿＿＿＿＿ 260—526 R X
3,726,917  4/1973  Brunie et al. ＿＿＿＿ 260—526 R X

OTHER REFERENCES

Chemical Abstracts 70:3187 X.
Chemistry and Industry, April 1954, pp. 384–7.

LEWIS GOTTS, Primary Examiner

E. G. LOVE, Assistant Examiner

U.S. Cl. X.R.

260—526 R, 595